United States Patent
Kitazawa et al.

(10) Patent No.: US 11,630,085 B2
(45) Date of Patent: Apr. 18, 2023

(54) ULTRASONIC INSPECTION METHOD AND ULTRASONIC INSPECTION APPARATUS

(71) Applicant: Hitachi-GE Nuclear Energy, Ltd., Hitachi (JP)

(72) Inventors: Sou Kitazawa, Tokyo (JP); Yasuhiro Nidaira, Hitachi (JP); Kazuya Ehara, Hitachi (JP); Junichiro Naganuma, Hitachi (JP)

(73) Assignee: Hitachi-GE Nuclear Energy, Ltd., Hitachi (JP)

(*) Notice: Subject to any disclaimer, the term of this patent is extended or adjusted under 35 U.S.C. 154(b) by 234 days.

(21) Appl. No.: 17/104,943

(22) Filed: Nov. 25, 2020

(65) Prior Publication Data
US 2021/0164943 A1 Jun. 3, 2021

(30) Foreign Application Priority Data
Nov. 29, 2019 (JP) .............................. JP2019-216271

(51) Int. Cl.
G01N 29/12 (2006.01)
G01N 29/04 (2006.01)
G01N 29/06 (2006.01)

(52) U.S. Cl.
CPC .......... *G01N 29/12* (2013.01); *G01N 29/043* (2013.01); *G01N 29/0609* (2013.01); *G01N 2291/044* (2013.01)

(58) Field of Classification Search
CPC .. G01N 29/12; G01N 29/043; G01N 29/0609; G01N 2291/044; G01N 29/4454; G01N 29/4463; G01N 29/343; G01S 15/104
See application file for complete search history.

(56) References Cited

U.S. PATENT DOCUMENTS

| 2008/0229833 A1* | 9/2008 | Asafusa ............ G01S 15/8959 73/627 |
| 2013/0023225 A1 | 1/2013 | Weber |
| 2019/0154820 A1 | 5/2019 | Ralston et al. |

FOREIGN PATENT DOCUMENTS

WO    WO 2017/188466 A1    11/2017

OTHER PUBLICATIONS

Extended European Search Report issued in European Application No. 20204485.5 dated Apr. 23, 2021 (eight (8) pages).
Ito, "Basic Theory of Radar System", First Edition, Corona Publishing Co., Ltd., Nov. 20, 2015, pp. 222-243 (plus cover and table of contents) (13 pages).

* cited by examiner

*Primary Examiner* — Xin Y Zhong
(74) *Attorney, Agent, or Firm* — Crowell & Moring LLP

(57) ABSTRACT

An ultrasonic inspection method in which a pulse signal is output to an ultrasonic sensor to generate and transmit ultrasonic waves, the ultrasonic waves reflected or scattered by an object are received and converted into a waveform signal by the ultrasonic sensor, and the waveform signal is digitized to acquire waveform data, includes: executing modulation processing for modulating a plurality of waveform data acquired in multiple inspections and under the same inspection conditions by a phase modulation method to generate composite waveform data; and executing demodulation processing for demodulating the composite waveform data to generate compressed waveform data.

4 Claims, 6 Drawing Sheets

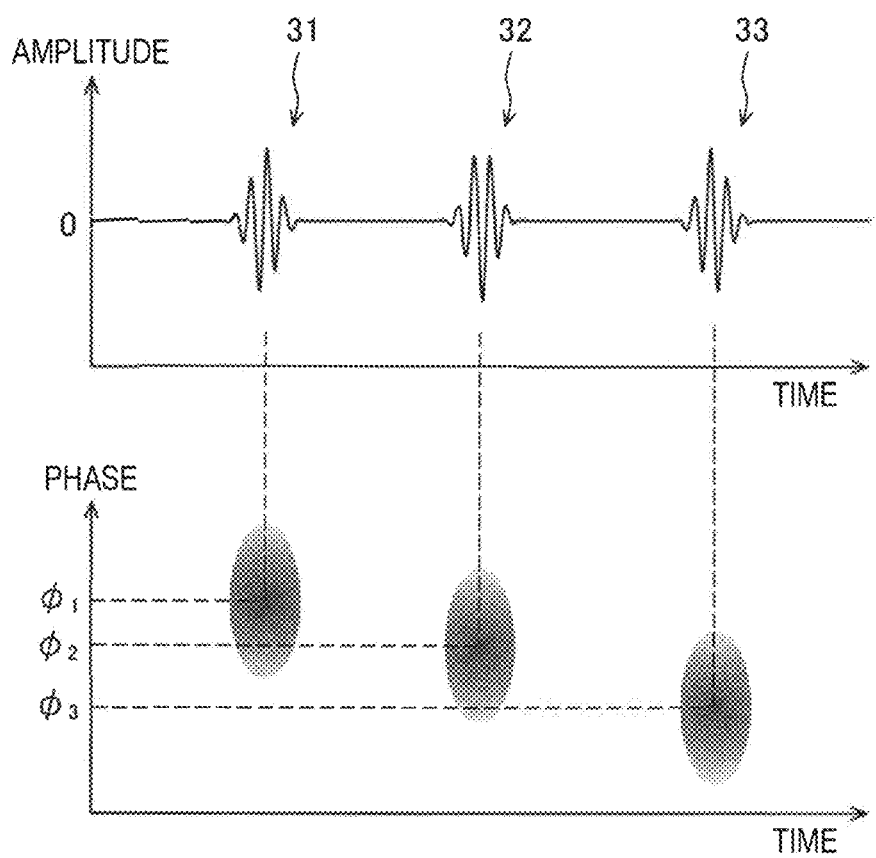

ULTRASONIC INSPECTION METHOD AND ULTRASONIC INSPECTION APPARATUS

BACKGROUND OF THE INVENTION

1. Field of the Invention

The present invention relates to an ultrasonic inspection method and an ultrasonic inspection apparatus.

2. Description of the Related Art

In recent years, sophistication of products in various industrial fields has been remarkable, and materials and structures of parts that make up the products have gradually become complicated accordingly. Thus, how to ensure reliability of the products is becoming an important issue. In other words, it can be said that importance of inspections during a manufacturing process, at the time of shipment, or in service of the products is increasing more than ever. An ultrasonic inspection method is one method for inspecting an object such as a product. In the ultrasonic inspection method, a pulse signal is output to an ultrasonic sensor to generate and transmit ultrasonic waves, and the ultrasonic waves reflected or scattered due to a defect of an object or the like is received and converted into a waveform signal by the ultrasonic sensor. This confirms soundness of the object.

If the object is made of a low-attenuation material (that is, a material with high ultrasonic transmission), there is no particular problem. However, if the object is composed of a high-attenuation material (specifically, a composite material that has been widely used in recent years, or a material that strongly attenuates ultrasonic waves, such as a stainless steel material with high corrosion resistance), the waveform signal is buried in a noise signal and cannot be recognized, making it difficult to inspect the object. Further, even if the object is not composed of the high-attenuation material, if a propagation path of the ultrasonic waves becomes long, the ultrasonic waves are also attenuated and a ratio of the waveform signal to the noise signal (SN ratio) deteriorates, thereby making it difficult to inspect the object. Although there are multiple causes for the noise signal, the noise is mainly scattered noise generated by scattering ultrasonic waves by crystal grains of a material constituting the object or electrical noise generated from a receiving circuit. In order to improve the SN ratio, the noise signal should be kept as small as possible. However, there is a limit to suppression of the electrical noise, and there is almost no countermeasure against the scattered noise determined by material characteristics.

As one method for solving such a problem, a processing technique called pulse compression is known, which is performed on the above-mentioned pulse signal and waveform signal (or digitized waveform data) (see Shinichi Ito, "Basic Theory of Radar System", First Edition, CORONA PUBLISHING CO., LTD., Nov. 20, 2015, pp. 222-243). In this pulse compression, the pulse signal is modulated by a phase modulation method or a linear frequency modulation method to expand a time width of the pulse signal. In the phase modulation method, a phase of the pulse signal is modulated according to a preset code string. In the linear frequency modulation method, a frequency of the pulse signal is modulated linearly with time. As the time width of the pulse signal expands, a time width of the waveform signal also expands. Therefore, the waveform signal is demodulated to reduce the time width of the waveform signal. As a result, time resolution of the waveform signal is increased, and an SN ratio can be increased.

SUMMARY OF THE INVENTION

However, the above-mentioned conventional art requires a special device for modulating the pulse signal, and this device is expensive. Therefore, it often hinders adoption of the above-mentioned conventional art.

An object of the present invention is to provide an ultrasonic inspection method and an ultrasonic inspection apparatus capable of improving an SN ratio without using a special device for modulating a pulse signal.

In order to achieve the above object, a typical invention of the present invention is an ultrasonic inspection method in which a pulse signal is output to an ultrasonic sensor to generate and transmit ultrasonic waves, the ultrasonic waves reflected or scattered by an object are received and converted into a waveform signal by the ultrasonic sensor, and the waveform signal is digitized to acquire waveform data, the method including: executing modulation processing for modulating a plurality of waveform data by a phase modulation method or a linear frequency modulation method to generate composite waveform data, the plurality of waveform data being acquired in multiple inspections and under the same inspection conditions or acquired by duplication; and executing demodulation processing for demodulating the composite waveform data to generate compressed waveform data.

According to the present invention, an SN ratio can be improved without using a special device for modulating a pulse signal.

BRIEF DESCRIPTION OF THE DRAWINGS

FIG. 9 is a diagram showing a phase acquisition result of waveform data according to a fourth modification of the present invention.

DESCRIPTION OF THE PREFERRED EMBODIMENTS

The present invention performs a processing technique called pulse compression not on a pulse signal and a waveform signal, but only on waveform data. An embodiment of the present invention will be described with reference to the drawings.

Figure 1:
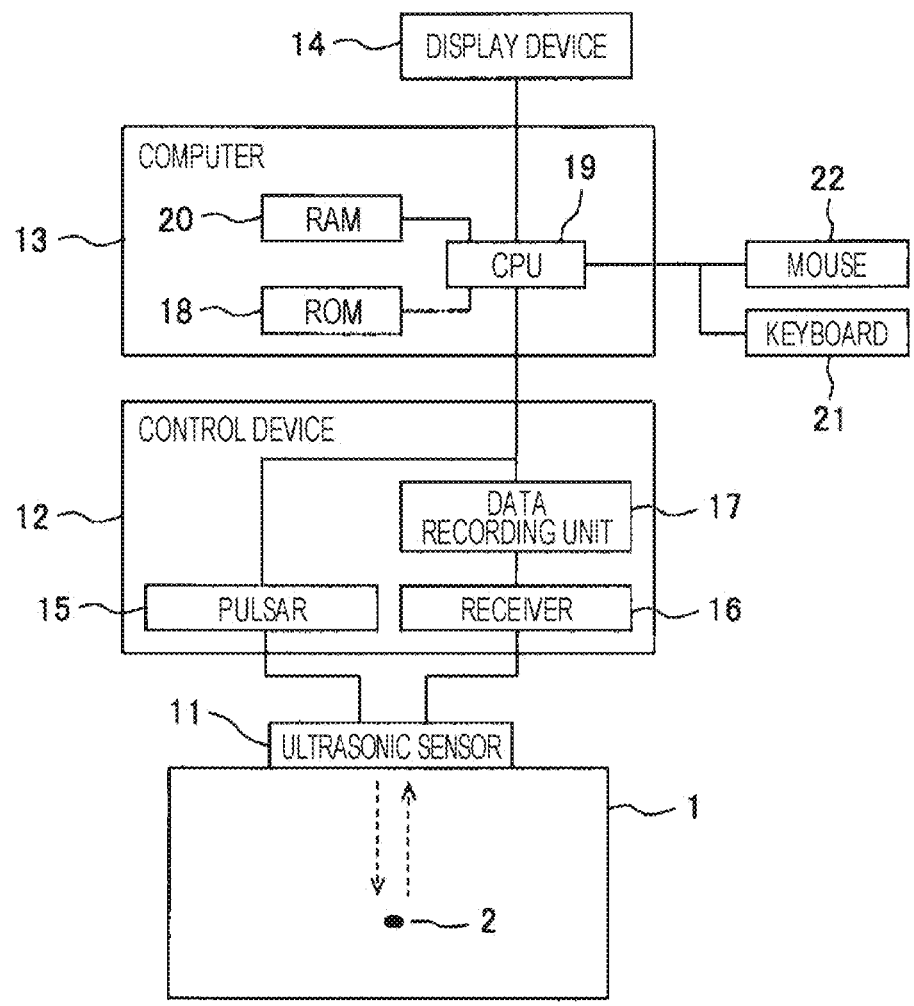
FIG. 1 is a block diagram showing a configuration of an ultrasonic inspection apparatus according to an embodiment of the present invention.

FIG. 1 is a block diagram showing a configuration of an ultrasonic inspection apparatus according to the present embodiment.

The ultrasonic inspection apparatus of the present embodiment includes an ultrasonic sensor 11, a control device 12 that controls the ultrasonic sensor 11, a computer 13 connected to the control device 12, and a display device (display) connected to the computer 13. The control device 12 has a pulsar 15, a receiver 16, and a data recording unit 17. The data recording unit 17 is composed of, for example, a hard disk or a memory. The computer 13 has a ROM 18 for storing a program, a CPU 19 for executing processing according to the program, and a RAM 20 for storing a processing result. Input devices such as a keyboard 21 and a mouse 22 are connected to the computer 13.

The pulsar 15 of the control device 12 outputs a pulse signal to the ultrasonic sensor 11. As a result, the ultrasonic sensor 11 generates ultrasonic waves, and the ultrasonic sensor 11 transmits the ultrasonic waves to an object 1. After that, the ultrasonic sensor 11 receives the ultrasonic waves reflected or scattered by a defect 2 or the like of the object 1 (specifically, for example, longitudinal waves or transverse waves), converts them into a waveform signal, and outputs the signal to the receiver 16 of the control device 12.

Figure 2:
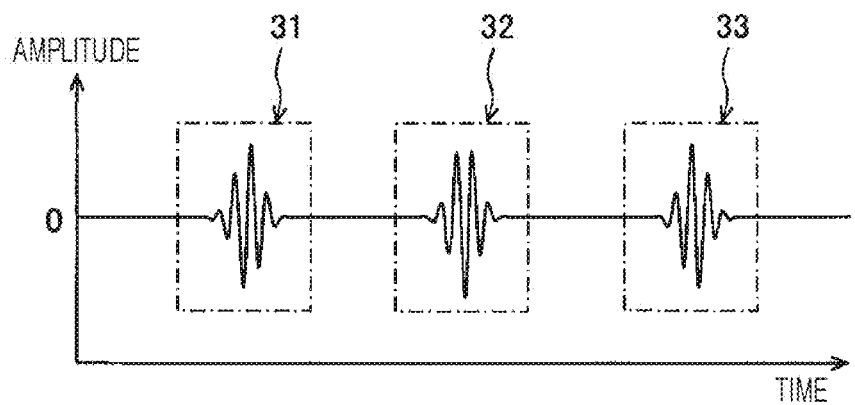
FIG. 2 is a diagram showing a specific example of data recorded by a control device according to the embodiment of the present invention.

The control device 12 digitizes an electric signal input from the ultrasonic sensor 11 via the receiver 16 and records the data in the data recording unit 17. As shown in FIG. 2, this data represents a time course of amplitude of the electric signal starting from output time of the pulse signal, and includes, for example, a plurality of waveform data 31, 32, 33.

The computer 13 causes the display device 14 to display the data recorded in the data recording unit 17 of the control device 12. An operator uses the input devices to extract waveform data from the data displayed on the display device 14. Each of the extracted waveform data may include only a first portion which is a portion corresponding to the ultrasonic waves received by the ultrasonic sensor 11 and having the amplitude of the signal larger than a predetermined value and changed continuously, or may include second and third portions which are portions that do not correspond to the ultrasonic waves received by the ultrasonic sensor 11, located before and after the first portion, and having the amplitude of the signal smaller than the predetermined value. The computer 13 performs a processing technique called pulse compression on the extracted waveform data.

Next, processing contents of the computer 13 as a feature of an ultrasonic inspection method of the present embodiment will be described with reference to FIGS. 3 to 5C.

Figure 3:
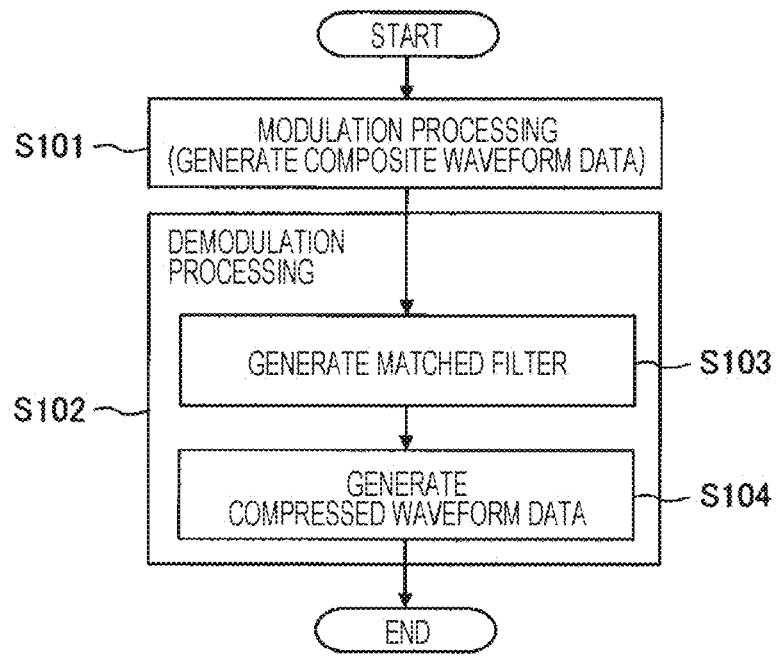
FIG. 3 is a flowchart showing processing contents of a computer according to the embodiment of the present invention.
Figure 4:
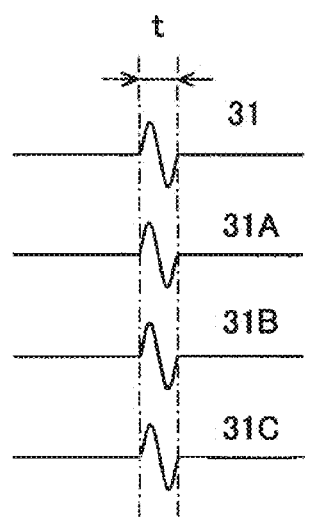
FIG. 4 is a diagram showing a plurality of waveform data according to the embodiment of the present invention.
Figure 5A:
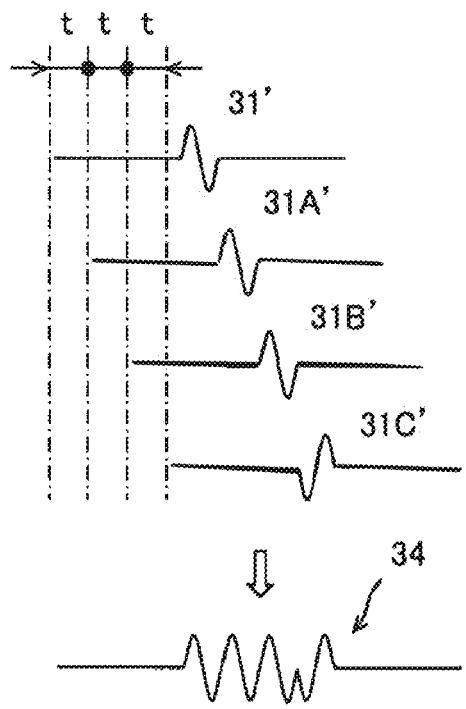
FIGS. 5A to 5C are diagrams showing composite waveform data, a matched filter, and compressed waveform data according to the embodiment of the present invention.
Figure 5B:
Figure 5C:
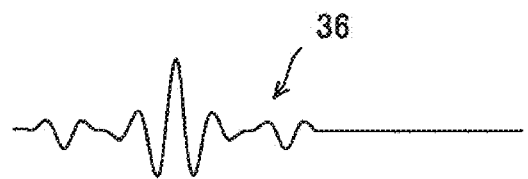

FIG. 3 is a flowchart showing the processing contents of the computer according to the present embodiment. FIG. 4 is a diagram showing a plurality of waveform data according to the present embodiment. FIGS. 5A to 5C are diagrams showing composite waveform data, a matched filter, and compressed waveform data, respectively, according to the present embodiment. Here, taking a case where a pulse signal is a sine wave of one wavelength as an example, waveform data is also shown assuming that the sine wave of one wavelength is included.

The computer 13 executes modulation processing for modulating a plurality of waveform data by a phase modulation method to generate composite waveform data (step S101 in FIG. 3). More specifically, for example, four waveform data 31, 31A, 31B, and 31C (see FIG. 4) acquired in four inspections and under the same inspection conditions (specifically, positions of the ultrasonic sensor 11 in the inspections are the same, an input time of a waveform signal is the same as an output time of the pulse signal, etc.) are used. Then, according to a preset code string, the waveform data 31, 31A, 31B is multiplied by a positive sign (specifically, for example, "1" or another constant) to obtain waveform data 31', 31A', 31B', and the waveform data 31C is multiplied by a negative sign (specifically, for example, "−1" or another constant) to obtain 31C'. Then, when a time width of each waveform data (here, a time width of the first portion described above) is defined as t, the waveform data 31A' is temporally shifted by t with respect to the waveform data 31', the waveform data 31B' is temporally shifted by t×2 with respect to the waveform data 31', and the waveform data 31C' is temporally shifted by t×3 with respect to the waveform data 31', and then the waveform data 31', 31A', 31B', and 31C' are added up. As a result, composite waveform data 34 (see FIG. 5A) is generated. Note that an effect of canceling side lobes can be obtained if an absolute value of the positive sign and an absolute value of the negative sign are the same, but the absolute values do not have to be the same.

The computer 13 executes demodulation processing for demodulating the composite waveform data 34 to generate compressed waveform data (step S102 in FIG. 3). More specifically, for example, if the composite waveform data 34 includes not only a first portion having signal amplitude larger than a predetermined value and changed continuously but also second and third portions located before and after the first portion and having signal amplitude smaller than the predetermined value, the second and third portions are removed. Then, the composite waveform data 34 is temporally inverted to generate a matched filter 35 (see FIG. 5B) (step S103 in FIG. 3). A time width of the matched filter 35 is Δt×4. Then, a convolution integral is performed on the composite waveform data 34 using the matched filter 35 to generate compressed waveform data 36 (see FIG. 5C) (step S104 in FIG. 3).

As described above, in the present embodiment, a processing technique called pulse compression can be performed without using a special device that modulates a pulse signal, and an SN ratio of the compressed waveform data 36 can be increased.

Figure 6A:
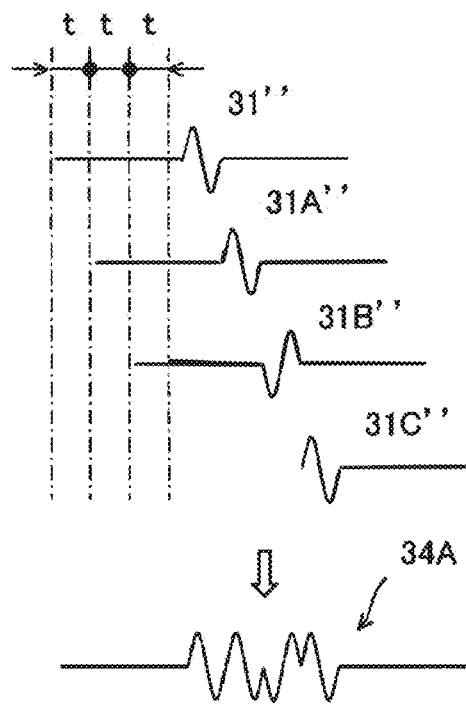
FIGS. 6A to 6C are diagrams showing composite waveform data, a matched filter, and compressed waveform data according to a first modification of the present invention.
Figure 6B:
Figure 6C:
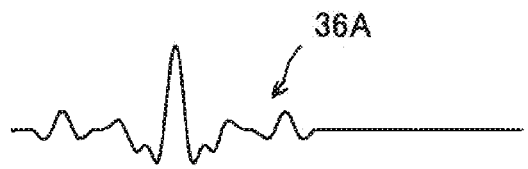

Note that, in the above embodiment, description has been given of a case where the computer 13 multiplies the waveform data 31, 31A, and 31B by the positive sign and multiplies the waveform data 31C by the negative sign according to the preset code string. However, the present invention is not limited to this, and other code strings may be followed. An example of such a modification will be described with reference to FIGS. 6A to 6C. FIGS. 6A to 6C are diagrams showing composite waveform data, a matched filter, and a compressed waveform data, respectively, in this modification.

In this modification, the computer 13 multiplies the waveform data 31, 31A, and 31C by a positive sign to obtain waveform data 31", 31A", and 31C" and multiplies the waveform data 31B by a negative sign to obtain waveform data 31B" according to a preset code string. Then, when a time width of each waveform data is defined as t, the waveform data 31A" is temporally shifted by t with respect to the waveform data 31", the waveform data 31B" is temporally shifted by t×2 with respect to the waveform data 31", and the waveform data 31C" is temporally shifted by t×3 with respect to the waveform data 31", and then the waveform data 31", 31A", 31B", 31C" are added up. As a result, composite waveform data 34A (see FIG. 6A) is generated.

If the composite waveform data 34A includes not only a first portion but also second and third portions, the computer 13 removes the second and third portions. Then, the composite waveform data 34A is temporally inverted to generate a matched filter 35A (see FIG. 6B). Then, a convolution integral is performed on the composite waveform data 34A using the matched filter 35A to generate compressed waveform data 36A (see FIG. 6C). Even in such a modification, the same effect as that of the above-described embodiment can be obtained.

Figure 7:
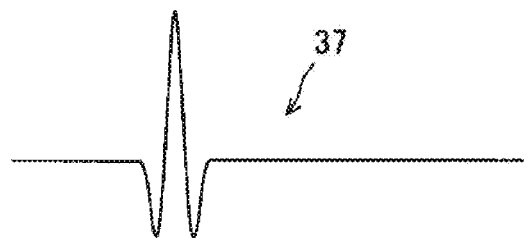
FIG. 7 is a diagram showing secondary compressed waveform data according to a second modification of the present invention.

Further, although not particularly described in the above-described embodiment and modification, the computer 13 may generate two types of composite waveform data using two types of code strings having a complementary relationship. Then, two types of matched filters obtained by temporally inverting the two types of composite waveform data may be generated, two types of primary compressed waveform data may be generated by performing a convolution integral on the two types of composite waveform data using the two types of matched filters, and secondary compressed waveform data may be generated by adding up the two types of primary compressed waveform data. As one specific example, the computer 13 may generate the above-mentioned compressed waveform data 36 and 36A (primary compressed waveform data) and add them together to generate secondary compressed waveform data 37 (see FIG. 7). As a result, side lobes of the compressed waveform data 36 and side lobes of the compressed waveform data 36A cancel each other out, so that an SN ratio of the secondary compressed waveform data 37 can be increased.

Figure 8A:
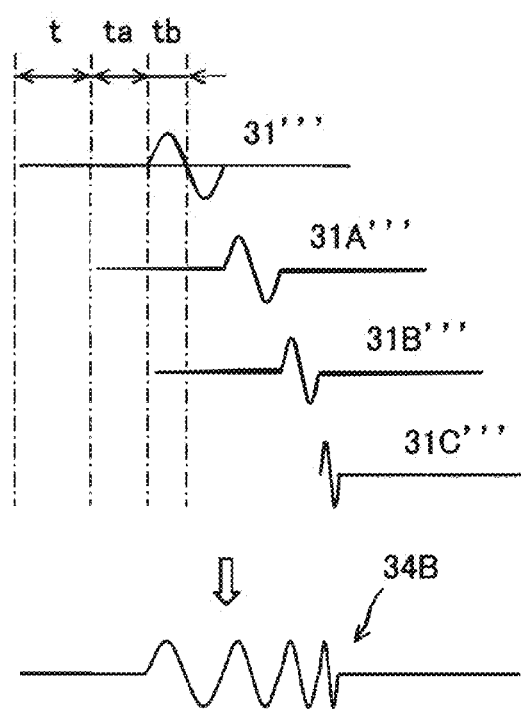
FIGS. 8A and 8B are diagrams showing composite waveform data, a matched filter, and compressed waveform data according to a third modification of the present invention.
Figure 8B:

Further, in the above embodiment, a case where the computer 13 modulates by the phase modulation method to generate the composite waveform data has been described as an example. However, the present invention is not limited to this. The computer 13 may modulate by a linear frequency modulation method to generate composite waveform data. An example of such a modification will be described with reference to FIGS. 8A to 8C together with FIG. 4 described above. FIGS. 8A to 8C are diagrams showing composite waveform data, a matched filter, and compressed waveform data, respectively, in this modification.

In this modification, the computer 13 uses, for example, four waveform data 31, 31A, 31B, and 31C (see FIG. 4) acquired in four inspections and under the same inspection conditions. Then, when a wavelength of each waveform data (here, a wavelength of the first portion described above) is defined as $\lambda$, a wavelength of the waveform data 31 is left as $\lambda$ to obtain wavelength data 31''', a wavelength of the waveform data 31A is modulated to $\lambda \times 3/4$ to obtain waveform data 31A''', a wavelength of the waveform data 31B is modulated to $\lambda \times 2/4$ to obtain waveform data 31B''', and a wavelength of the waveform data 31C is modulated to $\lambda \times 1/4$ to obtain waveform data 31C'''. Then, when a time width of the waveform data 31''' is t (wherein, t=$\lambda$ in this modification), a time width of the waveform data 31A''' is ta (wherein, ta=$\lambda \times 3/4$ in this modification), a time width of the waveform data 31B''' is tb (wherein, tb=$\lambda \times 2/4$ in this modification), and a time width of the waveform data 31C''' is tc (wherein, tc=$\lambda \times 1/4$ in this modification), the waveform data 31A''' is temporally shifted by t with respect to the waveform data 31''', the waveform data 31B''' is temporally shifted by (t+ta) with respect to the waveform data 31''', the waveform data 31C''' is temporally shifted by (t+ta+tb) with respect to the waveform data 31'''. Then, the waveform data 31''', 31A''', 31B''', and 31C''' are added together. As a result, composite waveform data 34B (see FIG. 8A) is generated.

If the composite waveform data 34B includes not only a first portion but also second and third portions, the computer 13 removes the second and third portions. Then, the composite waveform data 34B is temporally inverted to generate a matched filter 35B (see FIG. 8B). A time width of the matched filter 35B is (t+ta+tb+tc). Then, a convolution integral is performed on the composite waveform data 34B using the matched filter 35B to generate compressed waveform data 36B (see FIG. 8C). Even in such a modification, the same effect as that of the above-described embodiment can be obtained.

Further, in the above-described embodiment and modifications, a case where the computer 13 temporally inverts the composite waveform data to generate the matched filter has been described as an example. However, the present invention is not limited to this, and a matched filter may be generated by numerical analysis based on a pulse signal. Alternatively, multiple types of matched filters having the same wavelength but different phases may be generated by numerical analysis based on a pulse signal, and multiple types of compressed waveform data may be generated by performing a convolution integral on composite waveform data using the multiple types of matched filters. Then, for example, as shown in FIG. 9, time of the data including the waveform data 31, 32, 33 is taken on a horizontal axis, a phase of a matched filter is taken on a vertical axis, and amplitude of compressed waveform data corresponding to a combination of the time and the phase described above is displayed by gradation. As a result, as the phase of the waveform data 31, 32, or 33, a phase $\varphi 1$, $\varphi 2$, or $\varphi 3$ of the matched filter corresponding to the compressed waveform data having the maximum amplitude among the multiple types of compressed waveform data is acquired. Therefore, by grasping a phase change of the waveform data 31, 32, 33, it is possible to grasp a medium through which ultrasonic waves have passed and an influence of reflection, refraction, and the like.

Further, in the above-described embodiment and modifications, the modulation processing has been described by taking as an example a case where four waveform data 31, 31A, 31B, and 31C acquired in four inspections and under the same inspection conditions are used. However, the present invention is not limited to this. For example, a plurality of waveform data acquired in two, three, or five or more inspections and under the same inspection conditions may be used. Alternatively, for example, waveform data acquired in at least one inspection may be duplicated. Note that, in the former case, noise signals cancel each other out, so that an SN ratio can be improved. In the latter case, an effect of improving an SN ratio is diminished, but inspection time can be shortened.

What is claimed is:

1. An ultrasonic inspection method in which a pulse signal is output to an ultrasonic sensor to generate and transmit ultrasonic waves, the ultrasonic waves reflected or scattered by an object are received and converted into a waveform signal by the ultrasonic sensor, and the waveform signal is digitized to acquire waveform data, the ultrasonic inspection method comprising:

executing modulation processing for modulating a plurality of waveform data by a phase modulation method or a linear frequency modulation method to generate composite waveform data, the plurality of waveform data being acquired in multiple inspections and under the same inspection conditions or acquired by duplication; and executing demodulation processing for demodulating the composite waveform data to generate compressed waveform data;

wherein in the demodulation processing, multiple types of matched filters having different phases are generated by numerical analysis based on the pulse signal, a convolution integral is performed on the composite waveform data using the multiple types of matched filters to generate multiple types of compressed waveform data, and a phase of the matched filter corresponding to compressed waveform data having an amplitude that is a maximum among the multiple types of compressed waveform data is acquired as a phase of the waveform data.

2. The ultrasonic inspection method according to claim 1, wherein in the modulation processing, the composite waveform data is generated by a phase modulation method in which the plurality of waveform data is temporally shifted, multiplied by either a positive sign or a negative sign according to a preset code string, and added up.

3. An ultrasonic inspection apparatus comprising:
an ultrasonic sensor;
a control device that outputs a pulse signal to the ultrasonic sensor to generate and transmit ultrasonic waves, accepts a waveform signal in which the ultrasonic waves reflected or scattered by an object are received and converted by the ultrasonic sensor, and digitizes the waveform signal to acquire waveform data; and
a computer that processes the waveform data acquired by the control device, wherein
the computer executes
modulation processing for modulating a plurality of waveform data by a phase modulation method or a linear frequency modulation method to generate composite waveform data, the plurality of waveform data being acquired in multiple inspections and under the same inspection conditions or acquired by duplication; and
demodulation processing for demodulating the composite waveform data to generate compressed waveform data;
wherein in the demodulation processing, multiple types of matched filters having different phases are generated by numerical analysis based on the pulse signal, a convolution integral is performed on the composite waveform data using the multiple types of matched filters to generate multiple types of compressed waveform data, and a phase of the matched filter corresponding to compressed waveform data having an amplitude that is a maximum among the multiple types of compressed waveform data is acquired as a phase of the waveform data.

4. The ultrasonic inspection apparatus according to claim 3, wherein
in the modulation processing, the composite waveform data is generated by a phase modulation method in which the plurality of waveform data is temporally shifted, multiplied by either a positive sign or a negative sign according to a preset code string, and added up.

* * * * *